United States Patent Office 3,576,872
Patented Apr. 27, 1971

3,576,872
HERBICIDAL S-ARYL ARYLAMIDES
Gopal H. Singhal, Woodbridge, N.J., assignor to Esso Research and Engineering Company
No Drawing. Filed May 3, 1968, Ser. No. 726,567
Int. Cl. C07c *103/33*
U.S. Cl. 260—562                                          6 Claims

ABSTRACT OF THE DISCLOSURE

S-aryl arylamides of the formula

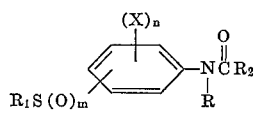

where $R_1$ is unsubstituted $C_6$–$C_{10}$ aryl or substituted $C_6$–$C_{14}$ aryl having one or more of the following groups situated anywhere along its aromatic nucleus or nuclei: halogen, cyano, nitro, amino, $C_1$–$C_6$ monoalkylamino, $C_2$–$C_8$ dialkylamino, $C_2$–$C_6$ alkylamido, $C_1$–$C_6$ alkoxy, $C_2$–$C_4$ alkenyl, and $C_2$–$C_4$ mono- and poly-haloalkenyl, etc.; X is one or more of the following: halogen, $C_1$–$C_6$ alkyl, $C_1$–$C_6$ alkoxy, $C_1$–$C_6$ mono- and polyhaloalkyl, amino, $C_1$–$C_6$ monoalkylamino, $C_2$–$C_8$ dialkylamino, nitro, cyano, etc.; $m$ is 0–2; $n$ is 0–4; R is hydrogen, $C_1$–$C_3$ hydrocarbyl, $C_1$–$C_6$ alkoxy, etc.; and $R_2$ is H, $C_3$–$C_6$ cycloalkyl, and $C_1$–$C_6$ hydrocarbyl, optionally substituted by halogen, hydroxy, alkoxy, thioalkyl, etc.

PRIOR ART

A number of halogen-substituted amides are well known in the art as effective herbicides. For example, U.S. 3,020,142 discloses the use of N-(3-chloro-4-methylphenyl)-2-methylpentanamide. Disclosed in German Pat. No. 1,039,779 is N-(3,4-dichlorophenyl)-propionamide, widely known as "Stam" in the herbicide art. Also known is N-(3,4-dichlorophenyl) cyclopropanecarboxamide, described in U.S. 3,306,727.

However, it has not been known heretofore that arylmercapto anilides, such as N-(4-arylmercapto) anilides, for example, which are included among the preferred compounds of this invention, are highly active herbicides, especially effective as post-emergence herbicides.

DESCRIPTION OF THE INVENTION

This invention relates to novel S-aryl arylamides and their use as pesticides. More particularly, this invention relates to novel S-aryl aniline or anilide derivatives and their use as pesticides, preferably as herbicides.

In general, the S-aryl arylamides of this invention are characterized by the formula:

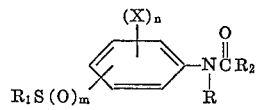

where $R_1$ is unsubstituted $C_6$–$C_{10}$ aryl, a 5- or 6-membered hetehocyclic compound having from 1 to 3 N-hetero atoms, or substituted $C_6$–$C_{10}$ aryl having one or more of the following groups situated anywhere along its aromatic nucleus or nuclei: halogen, cyano, nitro, amino, $C_1$–$C_6$ monoalkylamino, $C_2$–$C_8$ dialkylamino, $C_2$–$C_8$ alkylamido, $C_1$–$C_6$ alkoxy, aryloxy, thioalkyl, thioaryl, dialkylsulfamoyl, $C_2$–$C_4$ alkenyl, $C_2$–$C_4$ mono- and poly-haloalkenyl, etc.; X is halogen, $C_1$–$C_6$ alkyl, $C_1$–$C_6$ alkoxy, $C_1$–$C_6$ mono- and poly-haloalkyl, amino, $C_1$–$C_6$ monoalkylamino, $C_2$–$C_8$ dialkylamino, nitro, cyano, etc.; $m$ is 0–2; $n$ is 0–4; R is hydrogen, $C_1$–$C_3$ hydrocarbyl, $C_1$–$C_6$ alkoxy, etc.; and $R_2$ is H, $C_3$–$C_6$ cycloalkyl, and $C_1$–$C_6$ hydrocarbyl, optionally substituted by halogen, hydroxy, alkoxy, thioalkyl, etc.

Such S-aryl arylamides can be prepared by a number of different, conventional methods. For example, in one method, denominated herebelow as Method A, these products can be prepared by reaction of arylthioanilines of the general formula

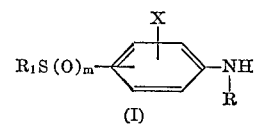

wherein $R_1$, X and R are as previously defined, with acid anhydrides of the formula

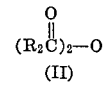

$R_2$ being as previously defined, either with or without a catalyst such as pyridine and in the presence or absence of a solvent.

Alternatively, the S-aryl arylamides of this invention can be prepared by another method, denominated herein as Method B, wherein: arylthioanilines, as defined by (I), are reacted with an acid halide of the formula $$R_2COHal \qquad (III)$$

wherein $R_2$ is as previously defined and Hal is chlorine or bromine, preferably chlorine, the reaction being effected in an inert solvent in the presence of an acid acceptor, such as an organic or inorganic base.

Another preparative method that can be employed in this invention is herein designated Method C, in which an arylthioaniline of (I) is reacted with an acid of the formula $$R_2CO_2H \qquad (IV)$$

wherein $R_2$ is as previously defined, in the presence of a catalyst, such as granulated zinc metal.

Still another preparative method that can be employed herein is that of Method D, in which an arylthioaniline of (I) is reacted with an ester of the formula $$R_2CO_2R_3 \qquad (V)$$

wherein $R_2$ is as previously defined and $R_3$ is lower alkyl or aryl.

Finally, in Method E, there is given still another preparative method by which the compounds of this invention can be made. In this method isocyanates derived from arylthioaniline (I) are reacted with carboxylic acids in accordance with the following equation:

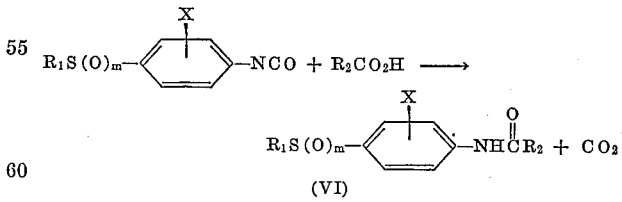

wherein $R_1$, $R_2$, X and $m$ are as previously defined.

Typical illustrative reactants employed for Method A include e.g.:

(a) 4-(phenylthio)-3-chloroaniline with any of the following exemplary anhydrides: propionic anhydride, acetic anhydride, 2-methyl-pentanoic anhydride, cyclopropane carboxylic anhydride, methacrylic acid anhydride, isobutyric anhydride, etc.;

(b) 4-(p-chlorophenylthio)-3-chloroaniline with any of the anhydrides given in (a);

(c) 4-(3',4'-dichlorophenylthio)-3-chloroaniline with any of the anhydrides given in (a);
(d) 4-(p-bromophenylthio)-3-chloroaniline with any of the anhydrides given in (a); and
(e) 4-(p-chlorophenylthio)-3-methylaniline with any of the anhydrides given in (a).

The reaction of Method A, as previously noted, can be carried out either with or without an inert (organic) solvent. The inert organic solvent can be a hydrocarbon such as ligroin, benzene, toluene, etc.; ethers such as dioxane; chlorinated hydrocarbons such as chlorobenzene, carbon tetrachloride, perchloroethylene, etc.

A few drops of a tertiary amine such as pyridine can be used as a catalyst.

Although the anhydride can be used as a solvent and the excess recovered for subsequent use, it is usually best to utilize equimolar amounts of both reactants.

The reaction temperatures can vary over a wide range of from about 0° C. to the boiling point of the solvent (ca. 150° C.).

The reactants employed in Method B are the arylthio-anilines (I) and acid chlorides (III).

Typical illustrative reactants employed for Method B include, e.g.:

(a) 4-(phenylthio)-3-chloroaniline with any of the following acid chlorides: acetyl chloride, propionyl chloride, isobutyryl chloride, methacryl chloride, 2-methyl pentanoyl chloride, fluoroacetyl chloride, cyclopropane carboxylic acid chloride, etc.;
(b) 4-(p-chlorophenylthio)-3-chloroaniline with any of the acid chlorides given in (a);
(c) 4-(3',4'-dichlorophenylthio)-3-chloroaniline with any of the acid chlorides given in (a);
(d) 4-(p-bromophenylthio)-3-chloroaniline with any of the acid chlorides given in (a); and
(e) 4-(p-chlorophenylthio)-3-methylaniline with any of the acid chlorides given in (a).

Equimolar ratios of the reactants are desirable in the reaction of Method B, and as solvents conventional solvents can be used: e.g., hydrocarbons like ligroin, benzene, toluene, etc., ethers such as diethylether, tetrahydrofuran, etc., chlorinated hydrocarbons such as chloroform, carbon tetrachloride, perchloroethylene, etc. As acid acceptors organic bases such as pyridine, triethylamine, etc. or inorganic bases such as sodium or potassium carbonate can be used. It is possible, moreover, to use an organic base such as pyridine as solvent also.

Typical illustrative reactants employed for Method C include, e.g., 4-(phenylthio)-3-chloroaniline; 4-(p-chlorophenylthio)-3-chloroaniline; 4-(p-bromophenylthio)-3-chloroaniline; 4-(3',4'-dichlorophenylthio)-3-chloroaniline; 4-(p-chlorophenylthio)-3-methylaniline, etc.; with any of the following exemplary acids: propionic acid; 2-methylpentanoic acid; cyclopropane carboxylic acid; methacrylic acid, etc.

In this method, equimolar amounts of the aniline and the acid can be used, but an aniline/acid molar ratio of 1 to 2 is advantageous. Use of a catalytic amount of zinc is also preferred. In addition, solvents such as benzene, toluene, xylene, chlorobenzene, dichlorobenzene, etc. are suitable for this reaction, along with a reflux time of 30 minutes to 24 hours, preferably 2 to 6 hours.

Typical illustrative reactants employed for Method D include, e.g.: 4-(phenylthio)-3-chloroaniline; 4-(p-chlorophenylthio)-3-chloroaniline; 4-(3',4'-dichlorophenylthio)-3-chloroaniline; 4-(p-bromophenylthio)-3-chloroaniline; 4-(p-chlorophenylthio)-3-methylaniline, etc., with any of the following exemplary esters: methyl propionate; methyl methacrylate; methyl isobutyrate; methyl-2-methylpentanoate; methyl cyclopropyl carboxylic acid ester; etc.

The reaction occurring in Method D can be carried out by refluxing equimolar amounts of the reactants in an inert organic solvent such as chlorobenzene, dichlorobenzene, xylene, etc. Alternatively, however, the ester can be used as a solvent, and the mixture refluxed until 1 mole of the alcohol is fractionated off from the products.

Typical illustrative reactants employed for Method E include, e.g.: 4-(phenylthio)-3-chlorophenyl isocyanate; 4-(p-chlorophenylthio)-3-chlorophenylisocyanate; 4-(3',4'-dichlorophenylthio)-3-chlorophenyl isocyanate; 4-(p-bromophenylthio)-3-chlorophenylisocyanate; 4-(p-chlorophenylthio)-3-methylphenylisocyanate; etc.; with any of the following exemplary acids: propionic acid; 2-methylpentanoic acid; methacrylic acid; 2-methylpentanoic acid; fluoroacetic acid; cyclopropanecarboxylic acid; etc.

The reaction of Method E is carried out by refluxing the reactants in a high boiling, inert solvent such as toluene, xylene, chlorobenzene, or dichlorobenzene, e.g., until the evolution of carbon dioxide is complete.

The preferred, novel S-aryl arylamide compounds of this invention are characterized by the formula:

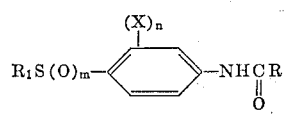

where:

(I) $R_1$ represents unsubstituted $C_6$–$C_{10}$ aryl such as phenyl, naphthyl, etc.; $C_6$–$C_{14}$ substituted aryl such as substituted phenyl, substituted naphthyl, etc., whose substituents can include one or more of the following: halogen; $C_1$–$C_3$ alkoxy such as methoxy, ethoxy, n-propoxy, isopropoxy; cyano; nitro; amino; $C_2$–$C_6$ alkylamido such as ethylamido through hexylamido; $C_2$–$C_4$ alkenyl such as ethenyl through butenyl; $C_2$–$C_4$ mono- and polyhaloalkenyl such as fluoroethenyl, chloroethenyl, trifluoropropenyl, dibromobutenyl, etc.;
(II) X represents one or more of the following or combinations thereof: halogen such as fluorine, chlorine, bromine, iodine, preferably chlorine; $C_1$–$C_6$ alkyl, such as methyl through hexyl; $C_1$–$C_6$ alkoxy such as methoxy through hexoxy; $C_1$–$C_6$ mono- and poly-haloalkyl such as mono-, di, and tri-fluorochloro-, bromo-, or iodo-substituted methyl through hexyl groups; amino; nitro, cyano; etc.;
(III) $n$ is 0–2;
(IV) $m$ is 0–2; and
(V) R represents hydrogen, $C_3$–$C_6$ cycloalkyl and $C_1$ to $C_6$ hydrocarbyl, optionally substituted by halogen, hydroxy, alkoxy, thioalkyl, etc.

Non-limiting, typical preferred S-aryl, arylamides of this invention exemplary of compounds embraced by the previous general formula in pages 2 and 3 include, but by no means exhaustively:

N-propionyl-(halophenylmercapto)aniline;
N-propinoyl-(cyanophenylmercapto)aniline;
N-propinoyl-(nitrophenylmercapto)aniline;
N-propionyl-(aminophenylmercapto)aniline;
N-propionyl-(substituted amino phenylmercapto)aniline;
N-propionyl-(perhaloalkylphenylmercapto)aniline;
N-propionyl-(alkylphenylmercapto)aniline;
N-propionyl-(carbaloxyphenylmercapto)aniline;
N-methacryl-(halophenylmercapto)aniline;
N-methacryl-(cyanophenylmercapto)aniline;
N-methacryl-(nitrophenylmercapto)aniline;
N-methacryl-(aminophenylmercapto)aniline;
N-methacryl-(perhaloalkylphenylmercapto)aniline;
N-methacryl-(alkylphenylmercapto)aniline;
N-methacryl-(carbalkoxyphenylmercapto)aniline;
N-2-methylpentanoyl-(halophenylmercapto)aniline;
N-2-methylpentanoyl-(cyanophenylmercapto)aniline;
N-2-methylpentanoyl-(nitrophenylmercapto)aniline;
N-2-methylpentanoyl-(aminophenylmercapto)aniline;
N-2-methylpentanoyl-(perhaloalkylphenylmercapto) aniline;
N-2-menthylpentanoyl-(alkylphenylmercapto)aniline;

N-2-methylpentanoyl-(carbalkoxyphenylmercapto)
aniline;
N-cyclopropionyl-(halophenylmercapto)aniline;
N-cyclopropionyl-(cyanophenylmercapto)aniline;
N-cyclopropionyl-(nitrophenylmercapto)aniline;
N-cyclopropionyl-(aminophenylmercapto)aniline;
N-cyclopropionyl-(perhaloalkylphenylmercapto)aniline;
N-cyclopropionyl-(alkylphenylmercapto)aniline;
N-cyclopropionyl-(carbalkoxyphenylmercapto)aniline;
N-alkyl-(halophenylmercapto)aniline;
N-alkyl-(cyanophenylmercapto)aniline;
N-alkyl-(nitrophenylmercapto)aniline;
N-alkyl-(aminophenylmercapto)aniline;
N-alkyl-(perhaloalkylphenylmercapto)aniline;
N-alkyl-(alkylphenylmercapto)aniline;
N-alkyl-(carbalkoxyphenylmercapto)aniline;
N-propionyl-(halosubstituted phenylmercapto)aniline;
N-propinoyl-(cyanosubstituted phenylmercapto)aniline;
N-propionyl-(nitrosubstituted phenylmercapto)aniline;
N-propionyl-(aminosubstituted phenylmercapto)aniline;
N-propionyl-(perhaloalkylsubstituted phenylmercapto)
anilinne;
N-propionyl-(alkylsubstituted phenylmercapto)aniline;
N-propionyl-(carbalkoxy substituted phenylmercapto)
aniline;
N-methacryl-(halosubstituted phenylmercapto)aniline;
N-methacryl-(cyanosubstituted phenylmercapto)aniline;
N-methacryl-(nitrosubstituted phenylmercapto)aniline;
N-methacryl-(aminosubstituted phenylmercapto)aniline;
N-methacryl-(perhaloalkylsubstituted phenylmercapto)
aniline;
N-methacryl(alkylsubsituted phenylmercapto)aniline;
N-methacryl-(carbaloxysubstituted phenylmercapto)
aniline;
N-2-methylpentanoyl-(halosubstituted phenylmercapto)
aniline;
N-2-methylpentanoyl-(cyanosubstituted phenylmercapto)
aniline;
N-2-methylpentanoyl-(nitrosubstituted phenylmercapto)
aniline;
N-2-methylpentanoyl-(aminosubstituted phenylmercapto)
aniline;
N-2-methylpentanoyl-(per-haloalkylsubstituted phenylmercapto)aniline;
N-2-methylpentanoyl-(alkylsubstituted phenylmercapto)
aniline;
N-2-methylpentanoyl-(carbalkoxysubstituted phenylmercapto)aniline;
N-cyclopropionyl-(halosubstituted phenylmercapto)
aniline;
N-cyclopropinoyl-(cyanosubstituted phenylmercapto)
aniline;
N-cyclopropionyl-(nitrosubstituted phenylmercapto)
aniline;
N-cyclopropionyl-(aminosubstituted phenylmercapto)
aniline;
N-cyclopropionyl-(perhaloalkylsubstituted phenylmercapto)aniline;
N-cyclopropionyl-(alkylsubstituted phenylmercapto)
aniline;
N-cyclopropionyl-(carbaloxysubstituted phenylmercapto)
aniline;
N-alkyl-(halosubstituted phenylmercapto) aniline;
N-alkyl-(cyanosubstituted phenylmercapto)aniline;
N-alkyl-(nitrosubstituted phenylmercapto)aniline;
N-alkyl-(aminosubstituted phenylmercapto)aniline;
N-alkyl-(perhaloalkylsubstituted phenylmercapto)aniline;
N-alkyl-(alkylsubstituted phenylmercapto)aniline;
N-alkyl-(carbalkoxylsubstituted phenylmercapto)aniline.

All of the foregoing specifically named examples of the compounds of this invention can, of course, be substituted by one or more of the desired groups previously defined by R, $R_1$, X, S, SO or $SO_2$. For example, the alkyl, propinoyl, methacryl, 2-methylpentanoyl, cyclopropionyl, and aniline moieties can be substituted by one or more of the exemplary groups previously defined by R, $R_1$, X, S, SO, or $SO_2$.

Non-limiting, representative examples of the foregoing preferred S-aryl arylamide compounds include, but by no means exhaustively: N-propinoyl; N-methacryl; N-2-methylpentanoyl; N-cyclopropionyl; form of -(3-chloro; 4-phenyl or substituted phenylmercapto)aniline; -(3-bromo, 4-phenyl or substituted phenylmercapto)aniline; -(3-cyano, 4-phenyl or substituted phenylmercapto)aniline; -(3-nitro, 4-phenyl or substituted phenylmercapto)aniline; -(3-amino, 4-phenyl or substituted phenyl mercapto)aniline; -(3-perhaloalkyl, 4-phenyl or substituted phenylmercapto)aniline; -(3-carbalkoxy, 4-phenyl or substituted phenylmercapto)aniline.

The most preferred compounds of this invention include: N-propionyl-(3-chloro, 4-phenylthio)aniline; N-propionyl-(3-chloro, 4-substituted phenylthio)aniline; N-propionyl [3-chloro, 4-(3',4'-dichlorophenylthio)] aniline; N-propionyl-(3-chloro, 4-phenylsulfonyl)aniline; N-propionyl-(3-chloro, 4-substituted phenylsulfonyl)aniline; N-methacryl-(3-chloro, 4-phenylthio)aniline; N-methacryl-(3-chloro, 4-substituted phenylthio)aniline; N-methacryl-(3-chloro, 4-phenylsulfonyl)aniline; N-methacryl-(3-chloro, 4-substituted phenylsulfenyl)aniline; and the N-cyclopropionyl and N-2-methyl-pentanoyl forms of: respectively, -(3-chloro, 4-phenylthio)aniline; -(3-chloro, 4-substituted phenylthio)aniline; -(3-chloro, 4-substituted phenylsulfonyl)aniline. By the expression "4-substituted phenyl . . ." is of course meant that a substituted phenyl group occupies the "4-position" of the aniline nucleus.

While not intending to be bound or limited by any theory, it is nevertheless believed that the presence of a chloro atom in the 3-position and/or a phenylmercapto group in the 4-position tend to impart increased herbicidal activity to the overall S-aryl arylamide moiety as a whole.

As previously noted, the S-aryl arylamides of this invention are useful as pesticides, particularly as herbicides. When used as herbicides, the biologically active S-aryl arylamides are preferably formulated with a suitable carrier or diluent or combinations thereof.

The term "carrier" or "diluent" as used herein means a material, which can be inorganic or organic and synthetic or of natural origin, with which the active S-aryl arylamide is mixed or formulated to facilitate its storage, transport, and handling and application. The carrier is preferably biologically and chemically inert and, as used, can be a solid or fluid. When solid carriers are used, they are preferably particulate, granular, or pelleted; however, other shapes and sizes of solid carrier can be employed as well. Such preferable solid carriers can be natural occurring minerals—although subsequently subjected to grinding, sieving, purification, and/or other treatments—including, for example, gypsum; tripolite; diatomaceous earth; mineral silicates such as mica, vermiculite, talc, and pyrophyllite; clays of the montmorillonite, kaolinite, or attapulgite groups; calcium or magnesium limes; or calcite and dolomite; etc. Carriers produced synthetically, as for example, synthetic hydrated silica oxides and synthetic calcium silicates can also be used, and many proprietary products of this type are available commercially. The carrier can also be an elemental substance such as sulfur or carbon, preferably an activated carbon. If the carrier possesses intrinsic catalytic activity such that it would decompose the active ingredient, it is advantageous to incorporate a stabilizing agent, as for example, polyglycols such as diethylene glycol to neutralize this activity and thereby prevent possible decomposition of the S-aryl arylamides.

For some purposes, a resinous or waxy carrier can be used, preferably one which is solvent soluble or thermoplastic, including fusible. Examples of such carriers are natural or synthetic resins such as a coumarone resin, rosin, copal, shellac, dammar, polyvinyl chloride, styrene polymers and copolymers, a solid grade of polychlorophenol such as is available under the registered trademark "Aroclor," a bitumen, an asphaltite, a wax, for example beeswax or a mineral wax such as paraffin wax or montan wax, or a chlorinated mineral wax, or a microcrystalline wax such as those available under the registered trademark "Mikrovan wax." Compositions comprising such resinous or waxy carriers are preferably in granular or pelleted form.

Fluid carriers can be liquids, as for example water, or an organic fluid, including a liquefied normally vaporous or gaseous material, or a vaporous or gaseous material, and can be solvents or non-solvents for the active material. For example, the horticultural petroleum spray oils boiling in the range of from about 275° to about 575° F., or boiling in the range of about 575° to about 1,000° F. and having an unsulfonatable residue of at least about 75% and preferably of at least about 90%, or mixtures of these two types of oil, are particularly suitable liquid carriers.

For application as a soil-applied herbicide, the preferable carrier should be a granular inert carrier for example 25/50 mesh (U.S. sieve size) or can also be a simple or compound fertilizer which can be a solid, preferably granular or pelleted, or a liquid, as for example an aqueous solution in which the toxicant is suspended or emulsified.

The carrier can be mixed or formulated with the active material during its manufacture or at any stage subsequently. The carrier can be mixed or formulated with the active material in any proportion depending on the nature of the carrier. One or more carriers, moreover, can be used in combination.

The compositions of this invention can be concentrates, suitable for storage or transport and containing, for example, from about 5 to about 90% by weight of the active S-aryl arylamides, preferably from about 20 to about 80 wt. percent. These concentrates can be diluted with the same or different carrier to a concentration suitable for application. The compositions of this invention can also be dilute compositions suitable for application. In general, concentrations of about 0.1 to about 10% by weight, of active material based on the total weight of the composition are satisfactory, although lower and higher concentrations can be applied if necessary.

The compositions of the invention can be formulated as wettable powders comprising a major proportion of the S-aryl arylamide mixed with a dispersing, i.e., deflocculating or suspending, agent, and, if desired, a finely divided solid carrier and/or a wetting agent. This can be in particulate form or adsorbed on the carrier and preferably constitutes at least about 10%, more preferably at least about 25%, by weight of the composition. The concentration of the dispersing agent should in general be between about 0.5 and about 5% by weight of the total composition, although larger or smaller amounts can be used if desired.

The dispersing agent used in the composition of this invention can be any substance having definite dispersing, i.e., deflocculating or suspending, properties as distinct from wetting properties, although these substances can also possess wetting properties as well.

The dispersant or dispersing agent used can be protective colloids such as gelatin, glue, casein, gums, or a synthetic polymeric material such as polyvinyl alcohol and methyl cellulose. Preferably, however, the dispersants or dispersing agents used are sodium or calcium salts of high molecular weight sulfonic acids, as for example the sodium or calcium salts of lignin sulfonic acids derived from sulfite cellulose waste liquors. The calcium or sodium salts of condensed aryl sulfonic acid, for example, the products known as "Tamol 731," are also suitable.

The wetting agents used can be non-ionic type surfactants, as for example, the condensation products of fatty acids containing at least 12, preferably 16 to 20, carbon atoms in the molecule, or abietic acid or naphthenic acid obtained in the refining of petroleum lubricating oil fractions with alkylene oxides such as ethylene oxide or propylene oxide, or with both ethylene oxide and propylene oxide, as, for example, the condensation product of oleic acid and ethylene oxide containing about 6 to 15 ethylene oxide units in the molecule. Other non-ionic wetting agents like polyalkylene oxide polymers, commercially known as "Pluronics" can be used. Partial esters of the above acids with polyhydric alcohols such as glycerol, polyglycerol, sorbitol, or mannitol can also be used.

Suitable anionic wetting agents include the alkali metal salts, preferably sodium salts, of sulfuric acid esters or sulfonic acids containing at least 10 carbon atoms in a molecule, for example, the sodium secondary alkyl sulfates, dialkyl sodium sulfosuccinate available under the registered trademark "Aerosol," sodium salts of sulfonated castor oil, sodium dodecyl benzene sulfonate, etc. The resulting wettable powder should preferably be ground to an average particle size of about 2–20 microns.

Granulated or pelleted compositions comprising a suitable carrier having the active S-aryl arylamides incorporated therein are also included in this invention. These can be prepared by impregnating a granular carrier with a solution of the S-aryl arylamides or by granulating a mixture of a finely divided solid carrier and the active S-aryl arylamides. The carrier used can consist of or contain a fertilizer or fertilizer mixture, as for example, a superphosphate.

The compositions of this invention can also be formulated as solutions of the active S-aryl arylamide ingredient in an organic solvent or mixture of solvents: for example alcohols; ketones, especially acetone; etc.

Compositions of the present invention can also be formulated as emulsifiable concentrates which are concentrated solutions or dispersions of the active ingredient in an organic liquid, preferably a water-insoluble organic liquid, containing an added emulsifying agent. These concentrates can also contain a proportion of water, for example, up to about 50% by volume, based on the total composition, to facilitate subsequent dilution with water. Suitable organic liquids include, e.g., the above petroleum hydrocarbon fractions previously described.

The emulsifying agent can be of the type producing water-in-oil type emulsions which are suitable for application by low volume spraying, or an emulsifier of the type producing oil-in-water emulsions can be used, producing concentrates which can be diluted with relatively large volumes of water for application by high volume spraying or relatively small volumes of water for low volume spraying. In such emulsions, the active S-aryl arylamide ingredient is preferably in a non-aqueous phase.

The present invention is further illustrated in greater detail by the following examples, but it is to be understood that the present invention, in its broadest aspects, is not necessarily limited in terms of the reactants, or specific temperatures, residence times, separation techniques, and other process conditions, or plants treated, dosage levels, exposure times, etc., by which the compounds and/or compositions described and claimed are prepared and/or used, as described in said following examples.

In the following examples, a number of the S-aryl arylamides of this invention were prepared from the corresponding arylamine. The amine itself was derived from various sulfide-containing nitro precursors whose sulfide content was oxidized to sulfone and whose nitro groups were reduced to the corresponding amino group.

EXAMPLE 1

In this example, a laboratory procedure is set forth for the preparation of a typical sulfur-containing nitro precursor, arylmercaptonitrobenzene.

Preparation of arylmercaptonitrobenzene

A solution of 3,4-dichloro-1-nitrobenzene in 1.2 liters of p-dioxane was made in a 4-necked 5 liter flask equipped with a mechanical stirrer, a reflux condenser, a thermometer, and a dropping funnel. To the solution was added a solution 289 g. of p-chlorothiophenol and 84 g. of sodium hydroxide in 800 ml. of water and 500 ml. of ethanol at a rapid rate. The reaction was exothermic and the temperature increased to 50° C. Within a few minutes the product started separating. The mixture was refluxed for 30 minutes, allowed to cool to room temperature, and was diluted with 2 liters of water. The solid product was collected by filtration, washed well with water, and air dried. The yield of almost pure product was 98%, and the product had a melting point range of 121–122° C. The resulting arylmercaptonitrobenzene can be recrystallized from a suitable organic solvent, with consequent yields usually in the range of 90–100%.

The following table, Table I includes a list of the compounds thus prepared:

Preparation of 4-chlorophenylmercapto-3-chloroaniline

To a stirred suspension of (1) 400 grams of 4-chlorophenylmercapto-3-chloronitrobenzene, (2) 800 grams of iron powder and (3) 2 liters of water at 50° C. were added dropwise 50 ml. of concentrated hydrochloric acid. After the reaction subsided, the mixture was refluxed for 2.5 hours, chilled, treated with 45 g. of sodium bicarbonate, and then filtered. The solid was extracted with 1.6 liters of boiling benzene in four portions.

The combined benzene solution was filtered and benzene removed under reduced pressure. The residual solid was washed with 500 ml. of petroleum ether to give 329 g. (91.4%) of the product, which had a melting point range of 70–71° C.

Alternatively, the nitro compounds can be easily reduced equally well by using iron-acetic acid, zinc-acetic acid, or tin-hydrochloric acid, or catalytically in a conventional manner.

Table II includes a list of the compounds thus prepared.

TABLE I

| Thiophenol reactant | Nitrobenzene reactant | Product | Product M.P., °C. |
|---|---|---|---|
| Thiophenol | 3,4-dichloronitrobenzene | C₆H₅–S–C₆H₃(Cl)–NO₂ | 111–112 |
| p-chlorothiophenol | 3,4-dichloronitrobenzene | Cl–C₆H₄–S–C₆H₃(Cl)–NO₂ | 122–123 |
| p-chlorothiophenol | 4-chloro-3-nitrobenzotrifluoride | Cl–C₆H₄–S–C₆H₃(NO₂)–CF₃ | 107–108 |
| p-toluenethiol | 3,4-dichloronitrobenzene | H₃C–C₆H₄–S–C₆H₃(Cl)–NO₂ | 110–121 |
| p-chlorothiophenol | 4-aromonitrobenzene | Cl–C₆H₄–S–C₆H₄–NO₂ | 83–84 |
| 3,4-dichlorobenzethiol | 3,4-dichloronitrobenzene | Cl₂C₆H₃–S–C₆H₃(Cl)–NO₂ | 129–130 |

EXAMPLE 2

In this example, the arylmercaptonitrobenzenes prepared in Example 1 were subjected to an oxidation step to convert their sulfide content to sulfone. An experimental procedure for this step is described below, wherein the specific preparation of 4-phenylsulfonyl-3-chloro-nitrobenzene is set forth:

Preparation of 4-phenylsulfonyl-3-chloronitrobenzene

A stirred suspension of 43.1 grams of 4-phenylmercapto-3-chloronitrobenzene in 850 ml. of glacial acetic acid was heated to a temperature of 60° C. and a solution of 40 grams of potassium permanganate in 450 ml. of water and was then added in portions at such a rate that temperature of the reaction was maintained at 70° C. without external heating. The mixture was stirred for 1 hour. Sodium bisulfite was added to decompose the oxidizing agents; and to the mixture 2 kg. of crushed ice were added. The white solid product was collected, washed with water, and air dried. The yield of the resultant product was 40.5 g. (84%), and had a melting point range of 141–143° C.

Other sulfides can be oxidized by the same method or with an excess of 30% hydrogen peroxide.

EXAMPLE 3

Reduction of the nitro group of the previously prepared sulfone of Example 2 or of the sulfide of Example 1 was effected in this example. Specifically, the preparation of 4-chlorophenylmercapto-3-chloroaniline is described in the following procedure to illustrate this reduction step.

TABLE II

| Product anilines | M.P., °C. |
|---|---|
| C₆H₅–S–C₆H₃(Cl)–NH₂ | 54–56 |
| Cl–C₆H₄–S–C₆H₃(Cl)–NH₂ | 70–71 |
| Cl–C₆H₄–S–C₆H₃(NH₂)–CF₃ | 51–52 |
| CH₃–C₆H₄–S–C₆H₃(Cl)–NH₂ | 59–76 |
| Cl–C₆H₄–S–C₆H₄–NH₂ | 60–61 |
| Cl–C₆H₃(Cl)–S–C₆H₃(Cl)–NH₂ | 102–103 |
| C₆H₅–SO₂–C₆H₃(Cl)–NH₂ | 171–173 |

EXAMPLE 4

From the recovered aromatic amine, a number of exemplary S-aryl, arylamides of this invention can be prepared in accordance with the following exemplary syntheses, showing the preparation of N-[4-(p-chlorophenylthio)phenyl] propionamide and of N-[4-(p-phenylsulfonyl)-3-chlorophenyl]-2-methyl pentanamide.

Preparation of N-[4-(p-chlorophenylthio)phenyl] propionamide

A stirred mixture of 9.5 grams of p-chlorophenylmercaptoaniline, 5.5 grams of propionic anhydride, 150 ml. of benzene and a few drops of pyridine was refluxed for 2.5 hours. The mixture was diluted with petroleum ether until turbidity appeared, at which time the mixture was allowed to stand. The resulting solid was collected and dried, affording a yield of 11 g. (93%) of the product having a melting point range of 145–146° C.

Preparation of N-[4-(p-p-phenylsulfonyl)-3-chlorophenyl]-2-methyl pentanamide To a stirred solution of 8 grams of 4-phenylsulfonyl-3-chloroaniline in 100 ml. of pyridine was added dropwise 5.5 grams of 2-methylpentanoyl chloride. The mixture was heated at 75–80° C. for 3 hours, cooled to room temperature, and poured into a solution of 170 grams of concentrated hydrochloric acid in 700 grams of water. The oil which separated out was taken up in benzene, washed successively with 10% hydrochloric acid, water, and a 5% sodium bicarbonate solution, dried over calcium chloride, filtered; and the solvent was then removed. The residual oil on treatment with ether-petroleum ether gave 8.3 grams (75.4%) of the solid product having a melting point range of 112–114° C.

Table III includes a list of other arylamides thus prepared.

TABLE III

| Arylamide product | M.P., ° C. |
|---|---|
| (phenyl)-S-(Cl-phenyl)-NHCOC₂H₅ | 107–108 |
| (phenyl)-SO₂-(Cl-phenyl)-NHCOC₂H₅ | 171–172 |
| (phenyl)-S-(Cl-phenyl)-NHCO-CH(CH₃)-C₃H₇ | 113–114 |
| Cl-(phenyl)-S-(Cl-phenyl)-NHCO-C₂H₅ | 136–137 |
| Cl-(phenyl)-S(O)-(Cl-phenyl)-NHCO-C₂H₅ | 207–208 |
| Cl-(phenyl)-SO₂-(Cl-phenyl)-NHCO-CH(CH₃)-C₃H₇ | 96–98 |
| Cl-(phenyl)-S-(NHCOC₂H₅, CF₃-phenyl) | 99–100 |

TABLE III.—Continued

| Arylamide product | M.P., ° C. |
|---|---|
| CH₃-(phenyl)-S-(Cl-phenyl)-NHCOC₂H₅ | 132–133 |
| Cl-(Cl-phenyl)-S-(Cl-phenyl)-NHCOC₂H₅ | 103–104 |

EXAMPLE 5

As an alternative procedure, S-aryl arylamide compounds such as N-[4-(phenylthio)-3-chlorophenyl] cyclopropane carboxamide can be prepared according to the following procedure.

Preparation of N-[4-(phenylthio)-3-chlorophenyl]cyclopropane carboxamide

To a stirred solution of 12 grams of 4-phenylmercapto-3-chloroaniline and 6 grams of triethylamine in 150 ml. of benzene was added 6 grams of cyclopropane carboxylic acid chloride in 50 ml. of benzene. The mixture was refluxed for 2 hours and then allowed to cool down to room temperature. To the mixture, 200 ml. of water and 200 ml. of petroleum ether were added, and the resulting mixture was stirred for a few minutes. The resulting solid which formed was collected, washed with water, and then dried, to yield 11.6 g. (74.5%) of the product which had a melting point range of 154–155° C.

Exemplary of arylamides that were prepared by this method are those included in Table IV below.

TABLE IV

| Arylamide product | M.P., ° C. |
|---|---|
| (phenyl)-S-(Cl-phenyl)-NHCO(CH₂)₈CH₃ | 60–62 |
| (phenyl)-S-(Cl-phenyl)-NHCO-CH₂Cl | 113–114 |
| H₃C-(phenyl)-S-(Cl-phenyl)-NHCO-cyclopropyl | 154–155 |
| Cl-(phenyl)-S-(Cl-phenyl)-NHCO-cyclopropyl | 181–182 |
| Cl-(phenyl)-S-(Cl-phenyl)-NHCO-(phenyl)-NO₂ | 211–212 |
| Cl-(phenyl)-S-(phenyl)-NHCO-cyclopropyl | 181–182 |
| Cl-(Cl-phenyl)-S-(Cl-phenyl)-NHCO-cyclopropyl | 127–128 |

EXAMPLE 6

In this example, the preparation of 4-p-chlorophenylmercapto-3-chlorophenylisocyanate is described.

Preparation of 4-p-chlorophenylmercapto-3-chlorophenylisocyanate

To a stirred solution of 40 grams of phosgene in 400 ml. of toluene was added, dropwise at 20–30° C., a solution of 67.5 grams of 4-p-chlorophenylmercapto-3-chloroaniline in 300 ml. of toluene. There was an immediate precipitation of a solid. The mixture was cautiously heated with stirring during 1 hour to 95° C. and finally refluxed for 2 hours. Toluene was distilled off. The residual oil was extracted with 600 ml. of boiling hexane in three portions. The hexane solution on cooling gave 57 grams (72.5%) yield of the product, which had a melting point range of 75–77° C.

Other isocyanates can be prepared essentially by the same method, and toluene can be replaced by other solvents such as dioxane, ethyl acetate, etc.

EXAMPLE 7

Representative S-aryl arylamide compounds from those prepared in the previous examples were evaluated for herbicidal activity in this example.

Post-emergence herbicide tests were carried out by spraying the materials as aqueous solutions or very small particle aqueous suspensions onto the test plants which were at the 1 to 2 leaf stage of growth. Sprayers were calibrated to deliver a certain volume of liquid, and the calculated amount of active ingredient which would give a rate corresponding to the indicated pounds per acre (broadcast) was dissolved or suspended. The plants were held in the greenhouse for 7 to 14 days before herbicide ratings were made.

A Rating system of 0–10 was used to score the tests. The 0 to 10 scale is defined as: 0=no injury; 1–3=slight injury; 4–6=moderate injury, plants may die; 7–9=severe injury, plants will probably die; and 10=all plants dead.

Testing data on the active compounds is found in Table V. The rating system used is indicated for each series of tests.

It should be understood, therefore, that the above description is merely illustrative of the preferred embodiments and specific examples of the present invention, and that in all of which embodiments and examples, variations, such as, e.g., those previously described, may be made by those skilled in the art without departing from the spirit and purview thereof, the invention being defined by the following claims.

What is claimed is:

1. The compound of the formula

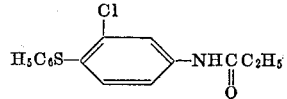

2. The compound of the formula

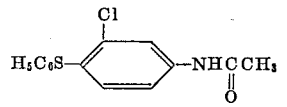

3. The compound of the formula

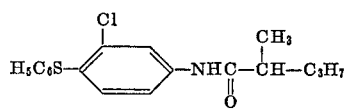

4. The compound of the formula

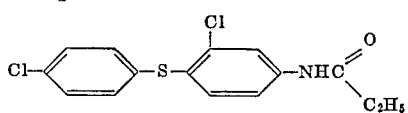

5. The compound of the formula

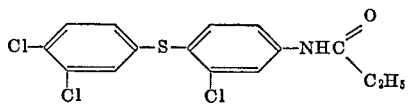

6. A compound characterized by the following structural formula:

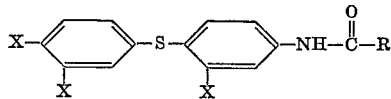

wherein X is one selected from the group consisting of hydrogen, chlorine, bromine and $CH_3$, R is one selected from the group consisting of $C_1$–$C_5$ alkyl, chloro-substituted $C_1$–$C_5$ alkyl, cyclopropyl and methacryl.

(References on following page)

TABLE V

| Compound | Dosage rate in lbs./acre | Morning glory | Velvet leaf | Mustard | Corn | Oats | Soybeans |
|---|---|---|---|---|---|---|---|
| 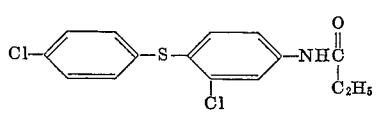 | 5 | 10 | 10 | 10 | 4 | 6 | 5 |
|  | 1.25 | 10 | 10 | 10 | 0 | 1 | 2 |
|  | 0.63 | 10 | 10 | 10 | 0 | 1 | 0 |
| 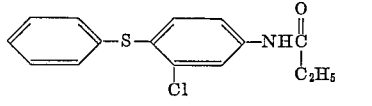 | 5 | 10 | 10 | 10 | 9 | 6 | 6 |
|  | 0.63 | 10 | 10 | 10 | 5 | 5 | 6 |
| 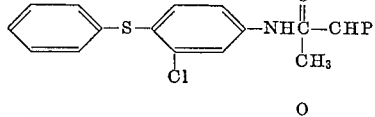 | 5 | 10 | 9 | 10 | 10 | 3 | 8 |
|  | 0.63 | 10 | 9 | 10 | 2 | 0 | 6 |
| 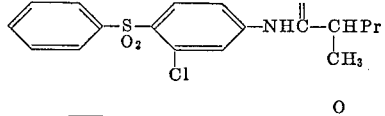 | 5 | 10 | 10 | 10 | 2 | 3 | 6 |
|  | 0.63 | 2 | 9 | 9 | 2 | 1 | 3 |
| 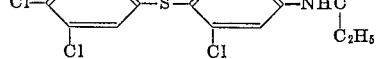 | 10 | 10 | 10 | 10 | 9 | 9 | 8 |

References Cited

UNITED STATES PATENTS

| | | | |
|---|---|---|---|
| 2,248,283 | 7/1941 | Raiziss et al. | 260—558 |
| 2,361,481 | 10/1944 | Kvalnes | 260—558 |
| 2,997,468 | 8/1961 | Schwartz | 260—558 |
| 3,050,524 | 8/1962 | Yale et al. | 260—558 |
| 3,057,861 | 10/1962 | Florey et al. | 260—558 |
| 3,138,572 | 6/1964 | Leandei et al. | 260—558 |
| 3,188,320 | 6/1965 | Sowinski et al. | 260—558 |
| 3,426,020 | 2/1969 | Dondzila et al. | 260—558 |

OTHER REFERENCES

Chemical Abstracts: vol. 51, col. 17798 (Gialdi: et al.); vol. 56 col. 14125b–g (Bracci et al.); vol. 59, col. 8635 (Ovelet et al. I; vol. 59, col. 13972–73 (Pappalardo et al.); vol. 60, col. 10685 (Quelet et al.; vol. 61, col. 4248 (Dran et al.); vol. 62, col. 6598–97 (Guzzi et al.); vol. 63, col. 5477 (Maki et al.); vol. 64, col. 8182–83 (Hunziker et al.).

HENRY R. JILES, Primary Examiner

H. I. MOATZ, Assistant Examiner

U.S. Cl. X.R.

71—103; 260—397.6 453, 465, 470, 556, 557, 558, 571, 576, 578, 580, 609